US009775189B2

(12) United States Patent
Joslyn et al.

(10) Patent No.: US 9,775,189 B2
(45) Date of Patent: Sep. 26, 2017

(54) SYSTEM AND METHOD FOR REDUCING CONTROL DATA TRAFFIC IN A WHITE SPACE NETWORK

(71) Applicant: QUALCOMM Incorporated, San Diego, CA (US)

(72) Inventors: Don Joslyn, DeBary, FL (US); Jeffery C. Schmidt, Orlando, FL (US); Sekhar V. Uppalapati, Longwood, FL (US)

(*) Notice: Subject to any disclaimer, the term of this patent is extended or adjusted under 35 U.S.C. 154(b) by 118 days.

(21) Appl. No.: 14/573,342

(22) Filed: Dec. 17, 2014

(65) Prior Publication Data
US 2015/0189688 A1 Jul. 2, 2015

Related U.S. Application Data

(60) Provisional application No. 61/920,852, filed on Dec. 26, 2013.

(51) Int. Cl.
*H04W 76/04* (2009.01)
*H04W 16/12* (2009.01)
*H04W 40/24* (2009.01)
*H04W 16/14* (2009.01)

(52) U.S. Cl.
CPC ......... *H04W 76/045* (2013.01); *H04W 16/12* (2013.01); *H04W 40/244* (2013.01); *H04W 16/14* (2013.01)

(58) Field of Classification Search
None
See application file for complete search history.

(56) References Cited

U.S. PATENT DOCUMENTS

| 9,491,628 | B2 * | 11/2016 | Schmidt | H04W 16/02 |
| 2004/0203824 | A1 | 10/2004 | Mock | |
| 2008/0004904 | A1 | 1/2008 | Tran | |
| 2011/0250915 | A1 * | 10/2011 | Stanforth | H04W 16/14 |
| | | | | 455/509 |
| 2012/0165059 | A1 * | 6/2012 | Schmidt | H04L 1/0016 |
| | | | | 455/513 |
| 2012/0300759 | A1 * | 11/2012 | Patanapongpibul | H04W 48/14 |
| | | | | 370/338 |
| 2013/0137399 | A1 | 5/2013 | Bari | |
| 2014/0003282 | A1 * | 1/2014 | Kafle | H04W 48/14 |
| | | | | 370/254 |

OTHER PUBLICATIONS

International Search Report and Written Opinion from corresponding International Application No. PCT/US2014/071900, dated Mar. 20, 2015.

* cited by examiner

*Primary Examiner* — Alejandro Rivero
(74) *Attorney, Agent, or Firm* — Qualcomm IP Dept.; James Hunt Yancey, Jr.

(57) ABSTRACT

Systems and methods to reduce control data traffic between a hub radio device (e.g., a master white space device) and spoke radio devices (e.g., slave white space devices). Reduced are the number of control messages and/or the amount of data transmitted in control data messages. The hub radio device stores data regarding the spoke radio devices that register for white space access (e.g., specific spectrum access credentials) with a spectrum management server via the hub radio device. As long as conditions regarding a spoke radio device remain relatively unchanged, the stored data for the spoke radio device may be used to maintain the white space access through periodic renewal of the corresponding channel authorization with the spectrum management server.

17 Claims, 3 Drawing Sheets

SYSTEM AND METHOD FOR REDUCING CONTROL DATA TRAFFIC IN A WHITE SPACE NETWORK

RELATED APPLICATION DATA

This application claims the benefit of U.S. Provisional Patent Application No. 61/920,852, filed Dec. 26, 2013, the disclosure of which is herein incorporated by reference in its entirety.

TECHNICAL FIELD OF THE INVENTION

The technology of the present disclosure relates generally to wireless communications and, more particularly, to a system and method for reducing control data traffic in a white space network in which a master device supports one or more slave devices.

BACKGROUND

Spectrum sharing is thought of as one of the most viable ways of improving the amount of spectrum available to wireless networks and other radio devices for conducting wireless communications. An exemplary spectrum sharing technique involves use of television white spaces under regulations set forth by an appropriate regulatory agency. An exemplary regulatory agency that regulates the use of wireless spectrum is the U.S. Federal Communications Commission (FCC). Other countries may have similar regulatory entities.

In the U.S., for example, the FCC has eliminated analog television (TV) broadcasts in favor of digital TV broadcasts. This has freed spectrum channels for use by unlicensed radio systems to offer various services, such as mobile communications and Internet access. In this context, the freed spectrum is commonly referred to as TV white space (or TVWS) but other types of white spaces are possible. In the case of TV white space, the white space is comprised of unused spectrum that is interleaved with spectrum used by incumbent radio devices in the channel 2 to channel 51 range (corresponding to 54 MHz to 698 MHz). Exemplary incumbent radio devices for TV white space include television broadcasters and other priority users of television channels. Under FCC regulations, for example, radio devices that use TVWS must register with a central database server (also referred to as a spectrum management server) and receive a channel list (also referred to as a channel map) of available channels for which the radio device may use in a shared environment with other TV band devices (TVBDs) while minimizing the possibility of creating undesirable interference to incumbent radio systems. The channel list that is generated for a radio device is generated by the central database server based on the location of the radio device. In this manner, the operation of incumbent radio devices having protected areas in which the radio device is located may be taken into account when determining channel availability.

Also, regulators and industry groups have proposed the use of geo-location database technology to control or manage spectrum access for radios in other situations. For example, use of geo-location database technology has been proposed for the 5 GHz UNII bands and for the 3.550 GHz to 3.650 GHz bands in which the U.S. government and military are incumbent users.

Outside the U.S., use of geo-location database technology has been proposed for TVWS bands in a number of countries. In the European Union (EU), TVWS sharing is often referred to as authorized shared access (ASA) and/or licensed shared access (LSA). Exemplary regulations for ASA/LSA are outlined in European Telecommunications Standards Institute (ETSI) EN 301 598. Other standards bodies have also proposed mechanisms for supporting spectrum sharing, such as the Internet Engineering Task Force's (IETF) Protocol to Access White Space (PAWS).

In white space networks, users of white space channels communicate with a database server (also referred to as a white space database (WSDB), geo-location database, spectrum management server, or white space allocation management system) to acquire specific spectrum access credentials that are a function of the location of the user. An exemplary set of specific spectrum access credentials is a white space channel list (also referred to as a channel map) that authorizes the user device to transmit on specified channels, at a specified location, at a maximum power, and for a specified period of time. One type of white space user is a master white space device (WSD) (sometimes referred to as a hub). Communications between the master WSD and the database server are over a medium that does not cause impermissible interference to a protected radio device. Typically, the medium involves the Internet to which the master WSD connects via a terrestrial connection or a cellular connection. As a result, master devices typically have Internet access to a TVWS database server over a medium that does not rely on TV white spaces and may make channel lists requests directly with the TVWS database server. An exemplary master WSD in this situation may be a fixed-location TVDB device.

Another type of white space user is a slave WSD (sometimes referred to as a spoke). A slave WSD does not have independent access to the Internet. To acquire a channel list from the database server, the slave WSD uses a radio link established with the master WSD over a white space channel as a pathway for Internet access. As such, the master WSD serves as an intermediary for communications between the slave WSDs and the database server. In this arrangement, the master WSD may proxy control data communications between the slave WSDs and the TVWS database server. As a result, slave devices may not have Internet access to a TVWS database server over a medium that does not rely on TV white spaces. Thus, slave devices typically depend on master WSDs to forward channel list request and other control messages to or from the TVWS database server. An exemplary slave WSD in this situation may be a mobile TVDB device, but it is possible that the slave WSD could be a fixed-location TVBD device.

Under certain white space regulations, master and slave devices periodically make requests and to a TVWS database server to update their respective lists of available white space channels and associated power limits. In some circumstances, slave WSDs make these requests every fifteen minutes. As the number of dependent slave devices grows, so does the amount of control data traffic generated between master and slave devices on the white space channels used to support the respective interfaces. The control data exchanged between devices reduces the wireless capacity available for exchanging user data on the affected white space channels.

A typical message flow for data exchange between a slave WSD 10 and a TVWS database server 12 under the conventional approach is shown in FIG. 1. In this data exchange, a master WSD 14 serves as an intermediary. At step 16, the master WSD 14 may broadcast a beacon containing generic parameters under which the slave WSD 10 may use to communicate with the master WSD 14 before the slave WSD 10 acquires specific spectrum access credentials. The WSD 14, after receipt of the beacon, sends a channel list request to the master WSD 14 at step 18. Upon receipt of the channel list request, the master WSD 14 sends a channel list request on behalf of the slave WSD 10 to the TVWS database server 12 at step 20. The TVWS database server 12 processes the channel list request and responds to the master WSD 14 at step 22 with specific spectrum access credentials for the slave WSD 10 (e.g., a channel list response). At step 24, the master WSD 14 sends the specific spectrum access credentials (e.g., the channel list response) from step 22 to the slave WSD 10.

Following receipt of the specific spectrum access credentials by the slave WSD 10, the slave WSD 10 selects a channel in the specific spectrum access credentials to use for wireless communications. The channel use selection is communicated to the master WSD 14 as a channel use notification at step 26 and the master WSD 14 communicates the channel use notification to the TVWS database server 12 at step 28. An acknowledgement in the form of a channel use response is sent from the TVWS database server 12 to the master WSD 14 at step 30 and the master WSD 14 communicates the channel use response to the slave WSD 10 at step 32.

DETAILED DESCRIPTION OF EMBODIMENTS

Figure 1:
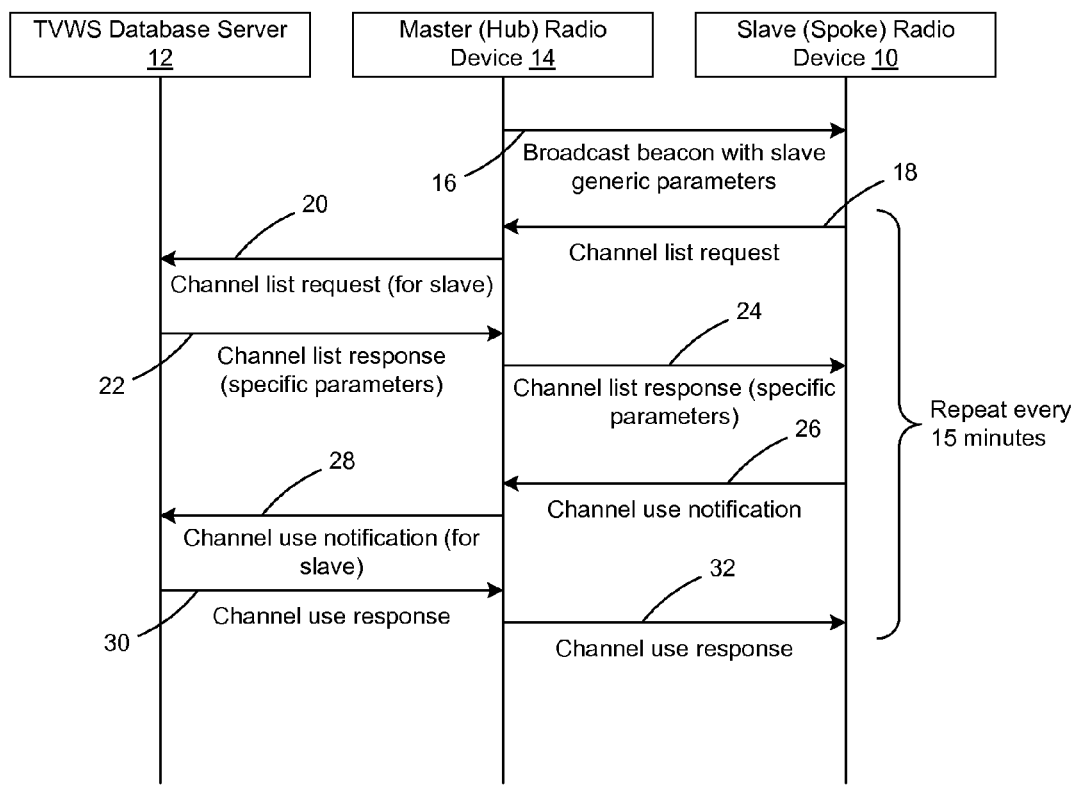
FIG. 1 is a message flow diagram of conventional communications among white space devices during acquisition and maintenance of channel authorizations for a slave white space device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Exchanging user data is typically the primary goal of wireless communication devices. Therefore, there is a need to lower the amount of control data traffic between master and slave WSDs so as to maximize the wireless capacity for exchanging user data. User data includes, but is not limited to, data that supports voice or video calls, data that supports the sending or receiving messages (e.g., email messages, text messages, multimedia messages, instant messages, etc.), data exchanged for accessing content from the Internet (e.g., web-browsing), data that supports file transfer (e.g., streaming video, obtaining or sending files), etc.

Disclosed are systems and methods to reduce control data traffic between a hub radio device (e.g., a master WSD) and spoke radio devices (e.g., slave WSDs). Under the disclosed techniques, the number of control messages may be reduced and/or the amount of data transmitted in the messages may be reduced. The hub radio device stores data regarding the spoke radio devices that register for white space access (e.g., specific spectrum access credentials) with a spectrum management server via the hub radio device. As long as conditions regarding a spoke radio device remain relatively unchanged, the stored data for the spoke radio device may be used to maintain the white space access through periodic renewal of the corresponding channel authorization with the spectrum management server.

Figure 2:
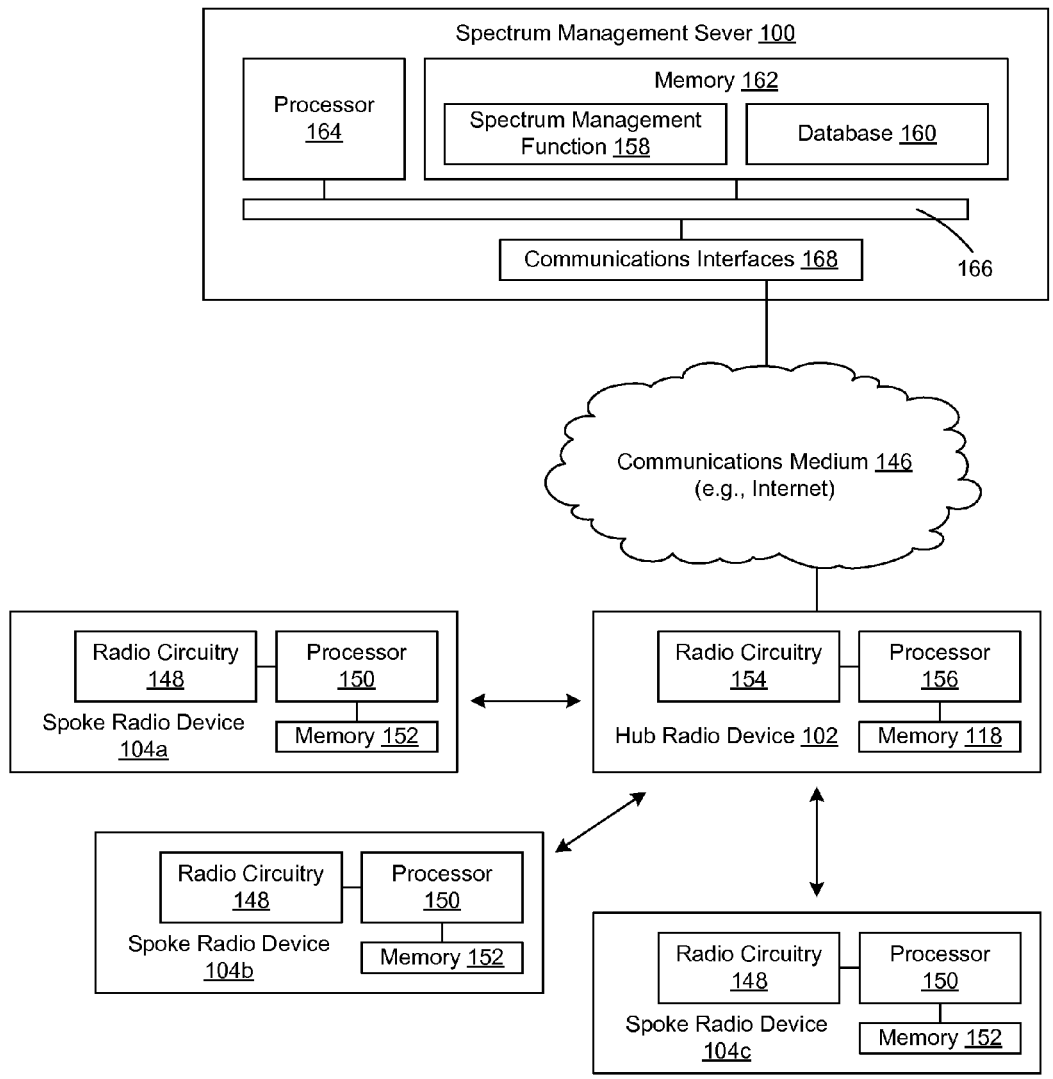
FIG. 2 is a schematic diagram of an exemplary system for facilitating channel authorization acquisition and maintenance for spoke radio devices according to the present invention.

With reference to FIG. 2, shown is an exemplary system that facilitates the acquisition and maintenance of specific spectrum access credentials (e.g., channel maps) for spoke radio devices that do not have a direct Internet connection. The system includes a sever 100, a hub radio device 102 and one or more spoke radio devices 104. In the illustrated example, there are three spoke radio devices, respectively identified by reference numerals 104*a*, 104*b* and 104*c*. The illustration of three spoke radio devices 104 is representative and there may be less than or more than three spoke radio devices 104 that communicate with the hub radio device 102 at any given time. The hub and spoke radio devices 102, 104 may be white space devices, such as TVBDs. As will be described, each of the server 100, the hub radio device 102 and the spoke radio device 104 are configured to carry out the respective logical functions that are described herein.

Figure 3:
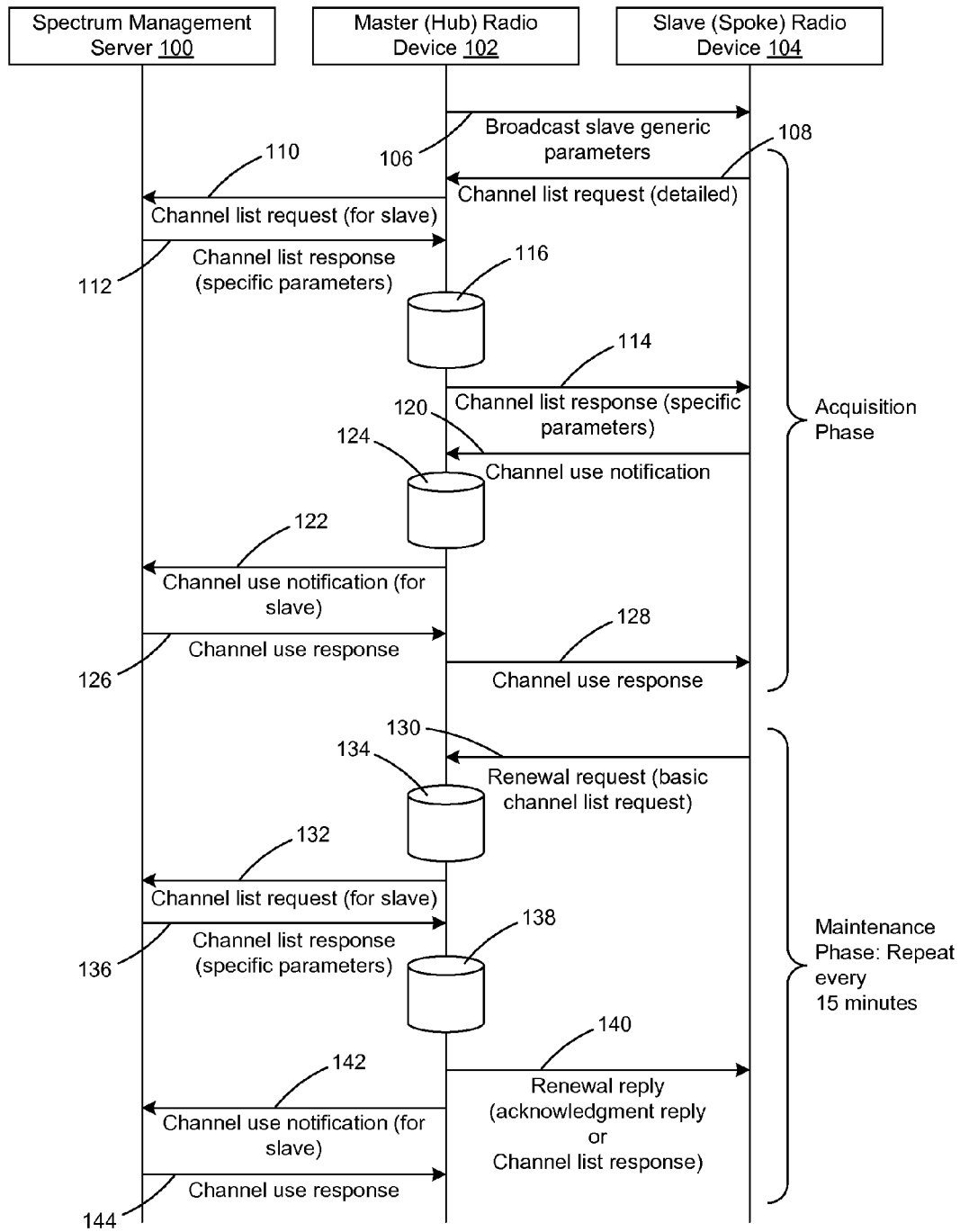
FIG. 3 is a message and process flow diagram of operations to acquire and maintain channel authorizations for a slave white space device in the system of FIG. 2.

With additional reference to FIG. 3, shown is a message and process flow diagram for operations carried out by the server 100, the hub radio device 102 and one of the spoke radio devices 104 during acquisition and maintenance of specific channel authorizations for the spoke radio device 104. The messages exchanged between the hub radio device 102 and the spoke radio device 104 that are illustrated in FIG. 3 represent control data messages. The operations of FIG. 3 may be repeated for any other spoke radio devices 104 that acquire and maintain specific channel authorizations through the hub radio device 102. Under the disclosed techniques, the hub radio device 102 keeps track of each spoke radio device 104 that is in current communication with the hub radio device 102. When the hub radio device 102 learns about a spoke radio device 104, such as by receiving a communication from the spoke radio device 104, the hub radio device 102 and the spoke radio device 104 may be considered to be in an associated state. As will be described, an initial control data exchange takes place to complete an acquisition phase in which the slave radio device 104 acquires specific channel authorization. Then, in a maintenance phase, control data is exchanged to maintain the validity of the specific channel authorization. The exchange of control data in the maintenance phase is repeated on a periodic basis.

At step 106, the hub radio device 104 broadcasts a beacon with generic channel authorization parameters that the spoke radio device 104 may use for communications with the hub radio device 102 before the spoke radio device 104 acquires specific channel authorizations. The generic channel authorization parameters specify one or more channels on which the spoke radio device 104 is allowed to communicate and transmit a power limit for each allowable channel. The generic channel authorization parameters are maintained by the hub radio device 102. The spoke radio device 104 receives the beacon and, in order to join a network of the hub radio device 102, initiates communication with the hub radio device 102 using the generic operating parameters specified in the beacon. For instance, a control data message is transmitted by the spoke radio device 104 on one of the allowable channels at a transmit power that does not exceed the corresponding transmit power limit from the generic channel authorization parameters. Generic operating parameters are used to reduce the potential for interference to protected entities. Since the hub radio device 102 may not know the location of the spoke radio device 104 prior to the spoke radio device 102 commencing communications except for assuming that the spoke radio device 104 is within a coverage area of the hub radio device 102, the generic parameters assume a worst case separation between the spoke radio device 102 and protected entities.

The communications between the spoke radio device 104 and the hub radio device 102 include an initial exchange of messages to complete the acquisition phase. As part of the acquisition phase, spoke radio device 104 acquires specific channel authorizations from the spectrum management server 100 in a process where the hub radio device 102 proxies communications between the spoke radio device 104 and the server 100.

The initial exchange of messages between the spoke radio device 104 and the hub radio device 102 may commence at step 108 where the spoke radio device 104 transmits a channel list request to the hub radio device 102. The channel list request includes a number of data items related to the spoke radio device 104. Exemplary data items include, but are not limited to, one or more of identity (e.g. a unique identifier such as one or more of an FCC ID, a serial number, an equipment identifier, a manufacturer identification, and a model identification), contact information for a user or owner of the spoke radio device 104 (e.g., full name, mailing or postal address, telephone number, email address, etc.), geo-location, antenna configuration or characteristics (e.g., height, height uncertainty, and antenna type), device capabilities (e.g. supported frequencies and transmit power level capabilities), device description, and other operational or configuration characteristics relating to the radio device. Location is typically determined by the spoke radio device 104 using GPS or another appropriate technique. Therefore, the location information in the channel list request may be specified using GPS coordinates or in another format. Also, the location information may include an accuracy value or a degree of confidence value.

Receipt of the channel list request by the hub radio device 102 triggers the hub radio device 102 to send a channel list request to the server 100 at step 110. The channel list request of step 110 is sent by the hub radio device 102 on behalf of the spoke radio device 104 to obtain specific operating parameters from the server 100 for the spoke radio device 104. The channel list request of step 110 typically includes the data items contained in the channel list request of step 108.

Receipt of the channel list request of step 110 by the server 100 triggers the server 100 to analyze the spectrum environment at the location of the spoke radio device 104 to determine specific operating parameters for the spoke radio device 104. In one embodiment, the specific operating parameters includes a list of channels that are available for use by the spoke radio device 104 (e.g., channels that are not occupied by a protected entity) and, for each available channel, an associated transmit power limit. At step 112, the server 100 sends a channel list response containing the specific operating parameters to the hub radio device 102. At step 114, the hub radio device 102 forwards the channel list response to the spoke radio device 104.

In addition, at process block 116, the hub radio device 102 stores the specific operating parameters from the channel list response and the data items from the channel list request of step 108 in a memory 118 (FIG. 2) of the hub radio device 102. The stored data may be used in subsequent processing to reduce control data traffic volume over white space channels.

Upon receipt of the channel list response, the spoke radio device 104 analyzes the specific operating parameters and selects one of the available channels for wireless communications. The spoke radio device 104 then communicates the channel selection to the server 100 by sending a channel use notification to the hub radio device 102 at step 120. Receipt of the channel use notification by the hub radio device 102 triggers the hub radio device 102 to send (e.g., retransmit) a channel use notification on behalf of the spoke radio device 104 to the server 100 at step 122.

In addition, at process block 124, the hub radio device 102 stores the channel selection, the transmit power level associated with the selected channel, and the geo-location of the spoke radio device 104 in the memory 118 of the hub radio device 102. The stored data may be used in subsequent processing to reduce control data traffic volume over white space channels.

The server 100 replies to the channel use notification by sending a channel use response to the hub radio device 102 at step 126. At step 128, the hub radio device 102 forwards the channel use response to the spoke radio device 104. The channel use response may serve as an acknowledgment that, once received by the spoke radio device 104, completes the acquisition phase for the spoke radio device 104 and permits the spoke radio device 104 to engage in wireless communications using the selected channel at the corresponding transmit power limit specified in the specific operating parameters. By the end of the communication sequence to complete the acquisition phase, the hub radio device 102 stores data derived from the channel list request, the geo-location of the spoke radio device 104, the channel list response information from the server 100, and channel use information. Although the illustrated sequence is for one spoke radio device 104, these data items are stored for each spoke radio device 104 that completes the acquisition phase using the hub radio device 102.

Following the acquisition phase, actions to maintain the validity of the specific operating parameters supplied to the spoke radio device 104 may be carried out in a maintenance phase, in lieu of repeating the entire initial channel acquisition process. Under the regulations of some jurisdictions, specific operating parameters for the spoke radio device are re-requested at specified intervals to ensure that the spoke radio device 104 may continue to use the currently selected channel and associated power limit. An exemplary interval to repeat the channel list request is fifteen minutes. In this situation, the control data messages of steps 106, 108, 110, 114, 120, 122, 126 and 128 would be transmitted every fifteen minutes as long as the spoke radio device 104 is to maintain its association with the hub radio device 102. The disclosed techniques are implemented to reduce control data traffic relative to the conventional approach of re-requesting the specific operating parameters. Reducing control data traffic in the maintenance phase may include sending fewer control data messages than the conventional approach and/or transmitting less data in the control data messages that are comparable to the control data messages sent during the acquisition phase.

In one embodiment, the spoke radio device 104 sends a renewal request in the form of a channel list request, but with fewer data items than the channel list request of step 108. For instance, the maintenance phase exchange may commence at step 130 where the spoke radio device 104 sends a basic channel list request to the hub radio device 102. The renewal request may include, as variable data items, only the identity information for the spoke radio device 104 and the current geo-location of the spoke radio device 104. Other fields, which are typically static, may be present that identify the message as a renewal request. In other embodiments, additional variable data items may be present, such as security keys, time stamps, etc. But the renewal request may be considered to be "smaller' than the channel list request of step 106 in that data items from the channel list request of step 106 are omitted, such as one or more of contact information for a user of the spoke radio device 104, antenna configuration, transmit power capability, device description, and other operational or configuration characteristics. The renewal request may include less variable data information than the full channel list request of step 108 since the full set of information was already communicated to the hub radio device 102 as part of the first channel list request that was used when the association between the master and slave was commenced, and this information was stored by the hub radio device 102. On the other hand, if any of the parameters other than geo-location have changed, the spoke radio device 104 may send a full channel list request to the master device instead of the renewal request.

Triggered by the receipt of the renewal request from the associated spoke radio device 104, the hub radio device 102 sends a full channel list request message to the server 100 on behalf of the spoke radio device 104 at step 132. The full channel list request message sent by the hub radio device 102 includes all information normally contained in a channel list request, including device identity, device location, and device characteristics (e.g., device capabilities and device description). Thus, with the possible exception of a change in geo-location, the data items concerning the spoke radio device 104 that are contained in the channel list request of step 110 are the same as the data items concerning the spoke radio device 104 in the channel list request of step 132. The hub radio device 102 constructs the channel list request of step 132 from data contained in the renewal request of step 130 and data stored in process block 116. Accordingly, the hub radio device 102 undertakes a read operation at process block 134 to retrieve stored data related to the spoke radio device 104 from the memory 118.

Comparable to the actions taken by the server 100 after receipt of the channel list request of step 110, when the server receives the channel list request of step 132 the server 100 analyzes the spectrum environment at the location of the spoke radio device 104 to determine specific operating parameters for the spoke radio device 104. At step 136, the server 100 sends a channel list response containing the specific operating parameters to the hub radio device 102.

The hub radio device 102 receives and processes the channel list response. The processing may include determining if the channel selected for use by the hub radio device 102 and the associated transmit power limit from the prior channel list response are still available to the spoke radio device 104. Availability may be determined by comparing values received in the channel list response received in step 136 with the previously stored channel selection of the spoke radio device 104 and the previous channel list response received for the spoke radio device 104 (e.g., the channel list response from step 112). For this operation, the hub radio device 102 undertakes a read operation at process block 138 to retrieve stored data from the memory 118.

At step 140, the hub radio device 102 sends a renewal reply that is responsive to the renewal request to the spoke radio device 104. If the selected channel and associated transmit power limit are still valid, the renewal reply sent by the hub radio device 102 to the spoke radio device 104 at step 140 is an acknowledgment reply. The acknowledgment reply need not contain specific operating parameters. In one embodiment, the acknowledgment reply contains a return code that indicates that the spoke radio device 104 may continue to operate using the selected channel and associated power limit. In this embodiment, the full channel list from the channel list response of step 136 is not sent to the spoke radio device 104 and the spoke radio device 104 does not send a channel use notification back to the hub radio device 102 in response to the acknowledgment reply. The hub radio device 102, however, may create a channel use notification message on behalf of the associated spoke radio device 104 and send the channel use notification to the server 100 at step 142. The server responds to the channel use notification by sending a channel use response to the hub radio device 102 at step 144. In one embodiment, the hub radio device 102 does not forward the channel use response or a substitute for the channel use response to the spoke radio device 104. Rather, the acknowledgment reply of step 140 serves as authentication for the spoke radio device 104 to continue to use the selected channel and associated transmit power limit for wireless communications.

Following receipt and analysis of the channel list response of step 136, if the hub radio device 102 determines that the selected channel and associated transmit power limit are no longer valid, then the hub radio device 102 may enter an exception handling routine. In the exception handling routine, the renewal reply of step 140 includes a channel list response containing the specific operating parameters from the channel list response of block 136 instead of the simple acknowledgment reply. In this case, the renewal reply of step 140 may take the same format as the channel list response of step 114. Receipt of a renewal reply that is in the form of a channel list response triggers the spoke radio device 104 to make a new channel selection, and re-enter the acquisition phase at step 120 by generating and sending a corresponding channel use notification to the hub radio device 102. Steps 122-128 will then ensue as described above.

Relative to the conventional approach of maintaining the validity of specific operating parameters for spoke radio devices 104, the described approach reduces control data traffic between the hub radio device 102 and each spoke radio device 104 associated with the hub radio device 102.

The spoke radio device 104 and the hub radio device 102 may include functionality to address changes and certain events. For example, if the spoke radio device 104 does not receive a response from the hub radio device 102 to the renewal request (step 130), then the spoke radio device 104 may stop transmitting on the selected channel under the specific parameters contained in the channel list response (step 114). In this case, the spoke radio device 104 reverts back to a channel and power limit found in the generic parameters broadcast by the hub radio device 102 and attempts to establish a new association with the hub radio device 102 (or a different hub radio device 102 that is detectable by the spoke radio device 104).

As another example, functionality may be present to address movement of the spoke radio device 104 by an amount exceeding a location tolerance for which the specific operating parameters are valid (e.g., typical regulations specify that if a device moves more than 50 meters, the device must request new specific operating parameters). In this situation, the spoke radio device 104 may send a channel list request message to the hub radio device 102. The channel list request may contain the device identity and new location in similar format to the renewal request described above. The hub radio device 102 may then construct a full channel list request (e.g., the channel list request of step 110) using stored information and the current location, and send the full channel list request to the server 100 on behalf of the spoke radio device 104. A channel list response may be received at the hub radio device 102 from the server 100 with specific operating parameters for the new location of the spoke radio device 104. The hub radio device 102 will evaluate the specific operating parameters in the channel list response to determine if the currently selected channel and associated transmit power limit are no longer available for use by the spoke radio device 104 at the new location. If so, the hub radio device 102 sends the new specific operating parameters received from the server 100 to the spoke radio device 104 and steps 120-128 may ensure. If the currently selected channel and associated transmit power limit are still available for use by the spoke radio device 104 at the new location, then the hub radio device 102 may acknowledge the spoke radio device 104 with an acknowledgment reply (e.g., the acknowledgment reply of step 140) that permits the spoke radio device 104 to continue wireless communication using the selected channel and associated transmit power limit. Steps 142 and 144 may ensue, and the spoke radio device 104 may avoid sending a channel use notification.

In the techniques disclosed thus far, the spoke radio device 104 initiates a series of events by sending a channel list request message (step 108) and, thereafter, sending periodic (e.g., every 15 minutes) renewal requests (step 130) to the hub radio device 102. In another embodiment, the control data traffic is still further reduced by not sending the renewal requests. In this embodiment, the hub radio device 102 automatically generates and sends a channel list request to the server 100 at appropriate times (e.g., every 15 minutes) on behalf of each spoke radio device 104 associated with the hub radio device 102. In this case, the spoke radio devices 104 do not need to create and send repeated channel list renewal request messages to the hub radio device 102. Instead, the spoke radio device 104 may send location updates to the hub radio device 102 when the location of the spoke radio device 104 changes by the amount exceeding a location tolerance for which the specific operating parameters are valid (e.g., 50 meters). This location update is processed by the hub radio device 102 as a renewal request received from the spoke radio device 104. The hub radio device 102 may then construct a full channel list request (e.g., the channel list request of step 110) using stored information and the current location, and send the full channel list request to the server 100 on behalf of the spoke radio device 104. A channel list response may be received at the hub radio device 102 from the server 100 with specific operating parameters for the new location of the spoke radio device 104. The hub radio device 102 will evaluate the specific operating parameters in the channel list response to determine if the currently selected channel and associated transmit power limit are no longer available for use by the spoke radio device 104 at the new location. If so, the hub radio device 102 sends the new specific operating parameters received from the server 100 to the spoke radio device 104 and steps 120-128 may ensure. If the currently selected channel and associated transmit power limit are still available for use by the spoke radio device 104 at the new location, then the hub radio device 102 may acknowledge the spoke radio device 104 with an acknowledgment reply (e.g., the acknowledgment reply of step 140) that permits the spoke radio device 104 to continue wireless communication using the selected channel and associated transmit power limit. Alternatively, the hub radio device 102 does not send a responsive control data message to the spoke radio device 104 and non-receipt of a control data message is interpreted by the spoke radio device 104 that continued operation on the selected channel is permissible. Steps 142 and 144 may ensue, and the spoke radio device 104 may avoid sending a channel use notification.

In one embodiment, the hub radio device 102 broadcasts specific operating parameters of known spoke radio devices 104 and corresponding spoke radio device 104 locations in the beacon with the generic operating parameters. The specific operating parameters may be broadcast without solicitation by a spoke radio device 104, and may be broadcast only during a specified period of time after receipt (e.g., during the 15 minute period after receipt or renewal) to ensure validity of the specific operating parameters. For example, the specific operating parameters for multiple spoke radio devices 104 may be aggregated into a single broadcast message that is transmitted at a channel list renewal interval for each of the spoke radio devices 104.

If one of the spoke radio devices 104 looses communications with the hub radio device 102 using generic operating parameters or specific operating parameters allocated to the spoke radio device 104, the specific operating parameters broadcast by the hub radio device 102 may be used by the spoke radio device 104 to maintain or restore connectivity with the hub radio device 102. Limits may be placed on the use of broadcast specific operating parameters that are broadcast in the beacon. For example, in order to use specific operating parameters from the beacon, the spoke radio device 104 may need to be within a predetermined distance (e.g., 50 meters) of the spoke radio device 104 location that corresponds to the specific operating parameters that the spoke radio device 104 desires to use. If the spoke radio device 104 were to use the specific operating parameters of another nearby spoke radio device 104, then communications with the hub radio device 102 may be carried out using more favorable parameters than the worst case generic operating parameters established for the entire coverage area of the hub radio device 102.

A number of advantages are attributable to the techniques for acquiring and maintaining specific operating parameters for spoke radio devices 104. These advantages include a general reduction in the control data traffic exchanged between the hub radio device 102 and each spoke radio device 104 by reducing the number of control data messages and, in some cases, the size of the control data messages.

Another advantage is that the spoke radio device 104 may send smaller channel list request during the maintenance phase in the form of the renewal requests. When a hub radio device 102 becomes associated with a spoke radio device 104, the hub radio device 102 saves spoke radio device 104 information and parameters. The hub radio device 102 uses the saved information and parameters to create complete channel list requests that are sent to the server 100 on behalf of the spoke radio device 104. Therefore, the size of control data messages between the hub radio device 102 and spoke radio devices 104 may be reduced.

Another advantage is a reduction in the number of channel use notification messages that are sent from the spoke radio device 104. In some situations, the spoke radio device 104 sends a channel use notification message with associated data to the hub radio device 102 only once during the association. After the hub radio device 102 and the spoke radio device 104 are associated, the hub radio device 102 creates and sends subsequent channel use notification messages to the server 100 on behalf of the spoke radio device 104. This reduces the amount and size of control data traffic between the hub radio device 102 and spoke radio devices 104.

There may be alternative terms for many of the terms used herein. For example, a spoke radio device 104 may be referred to as a slave device, a slave, or a spoke or, in the case of a white space environment, a slave WSD. A hub radio device 102 also may be referred to as a master device, a master, or a hub or, in the case of a white space environment, a master WSD. An available spectrum request also may be referred to as a channel list request or, more specifically in the case of a white space environment, a white space channel list request or a white space channel map request. An available spectrum response also may be referred to as a channel list response or, more specifically in the case of a white space environment, a white space channel list response or a white space channel map response. A spectrum use notification also may be referred to as a channel use notification. Spectrum access credentials also may be referred to as channel access credentials, operating parameters or, more specifically in the case of a white space environment, a white space channel list or a channel map.

It will be understood that some of the described operations are carried out by the server 100, some of the operations are carried out by the hub radio device 102, and some of the operations are carried out by the spoke radio device 104. Tasks carried out by each device respectively may be considered a method carried out by that device. For these purposes, each of these devices includes appropriate control circuitry and/or processors and memory components. Logical instructions to carry out the respective processes may be embodied as software that is executed by the relevant device and that is stored on a non-transitory computer readable medium (e.g., computer memory) of the relevant device.

FIG. 2 is a schematic block diagram of an exemplary system for implementing the disclosed techniques. The hub radio device 102 may be or may include any type of electronic device that engages in wireless communications, such a computing device, an information and/or entertainment system, a modem and router for providing Internet connectivity to other devices, etc. In a typical embodiment, the hub radio device 102 is a fixed-location device, but could be a mobile device, such as a mobile phone, tablet, etc. Similarly, the spoke radio device 104 may be or may include any type of fixed or mobile electronic device that engages in wireless communications, such a computing device, an information and/or entertainment system, a mobile phone, a modem and router for providing Internet connectivity to other devices, etc.

The server 100 communicates with the hub radio device 102 over any appropriate communications medium 146, such as one or more of the Internet, a cellular network, a WiFi network, etc. In addition to carrying out the operations described herein, the server 100 may be a central white space registration system or some other form of spectrum management platform.

Each spoke radio device 104 is location aware. For instance, the spoke radio device 104 may be capable of determining its position (also referred to as geo-location) using a location-determining technique, such as GPS or other technology. In some embodiments, the spoke radio device 104 may have a GPS receiver that is used to receive GPS satellite signals from which position coordinates are triangulated. Furthermore, if the spoke radio device 104 is a mobile device, it may be capable of manually or autonomously updating its determined position as it moves.

Each spoke radio device 104 includes communications circuitry, such as radio circuitry 148. The radio circuitry 148 may include one or more radio modems (e.g., radio transceivers) and corresponding antenna assemblies to allow for communications over various types of network connections and/or protocols. The radio circuitry 148 may be used to carry out various wireless communications functions, including communicating with the hub radio device 102 using generic access credentials. The spoke radio device 104 may use the hub radio device 102 as a proxy to gain specific access credentials or may communicate with the server 100 via the hub radio device 102 to gain specific access credentials. Once specific access credentials are acquired by the spoke radio device 104, the spoke radio device 104 may engage in various communications functions such as, but not limited to, engaging in voice or video calls, and sending or receiving messages (e.g., email messages, text messages, multimedia messages, instant messages, etc.), accessing the Internet, transferring data (e.g., streaming video, obtaining or sending files), etc.

Overall functionality of each spoke radio device 104 may be controlled by a control circuit that includes a processing device 150. The processing device 150 may execute code that is stored in a memory 152. For instance, the processing device 150 may be used to execute an operating system and other applications that are installed on the spoke radio device 104. The operating system or applications may include executable logic to implement the functions of the spoke radio device 104 that are described herein. The memory 150 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 150 includes a non-volatile memory for long term data storage and a volatile memory that functions as system memory for the control circuit.

The spoke radio device 104 may include any other appropriate components such as, but not limited to, a display, a speaker, a microphone, a user interface (e.g., a keypad and/or a touch-sensitive input), motion sensors, etc.

Similar to the spoke radio devices 104, the hub radio device 102 includes communications circuitry, such as radio circuitry 154. The radio circuitry 154 may include one or more radio modems (e.g., radio transceivers) and corresponding antenna assemblies to allow for communications over various types of network connections and/or protocols. The radio circuitry 154 may be used to carry out various wireless communications functions, including communicating with the spoke radio devices 104 using generic access credentials.

Overall functionality of the hub radio device 102 may be controlled by a control circuit that includes a processing device 156. The processing device 156 may execute code that is stored in the memory 118. For instance, the processing device 156 may be used to execute an operating system and other applications that are installed on the hub radio device 102. The operating system or applications may include executable logic to implement the functions of the hub radio device 102 that are described herein. The memory 118 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 118 includes a non-volatile memory for long term data storage and a volatile memory that functions as system memory for the control circuit.

The hub radio device 102 may include any other appropriate components such as, but not limited to, a display, a speaker, a microphone, a user interface (e.g., a keypad and/or a touch-sensitive input), motion sensors, etc.

The server 100 may be implemented as a computer-based system that is capable of executing computer applications (e.g., software programs), including a spectrum management function 158 that, when executed, carries out functions of the server 100 that are described herein. The spectrum management function 158 and a database 160 may be stored on a non-transitory computer readable medium, such as a memory 162. The database 160 may be used to store various information sets used to carry out the functions described in this disclosure. For instance, the server 100 may store or access data about known protected radio devices. The memory 162 may be a magnetic, optical or electronic storage device (e.g., hard disk, optical disk, flash memory, etc.), and may comprise several devices, including volatile and non-volatile memory components. Accordingly, the memory 162 may include, for example, random access memory (RAM) for acting as system memory, read-only memory (ROM), solid-state drives, hard disks, optical disks (e.g., CDs and DVDs), tapes, flash devices and/or other memory components, plus associated drives, players and/or readers for the memory devices.

To execute logical operations, the server 100 may include one or more processors 164 used to execute instructions that carry out logic routines. The processor 164 and the memory 162 may be coupled using a local interface 166. The local interface 166 may be, for example, a data bus with accompanying control bus, a network, or other subsystem.

The server 100 may have various input/output (I/O) interfaces for operatively connecting to various peripheral devices, as well as one or more communications interfaces 168. The communications interface 168 may include for example, a modem and/or a network interface card. The communications interface 168 may enable the server 100 to send and receive data signals, voice signals, video signals, and the like to and from other computing devices via an external network. In particular, the communications interface 168 may operatively connect the server 100 to the communications medium 146.

In one embodiment, the server 100 may be configured to host the above-described services for a plurality of electronic devices, including the hub and spoke radio devices 102, 104. In some embodiments, the services may include spectrum management functions, such as providing specific channel access credentials and/or generic channel access credentials to qualified radio devices upon registration so as to allow the radio devices to make use of spectrum for wireless communications. Also, while the providing of services may be fully automated, the server 100 may host an Internet-style website for the various corresponding parties to conduct initial enrollment with the server 100, conduct manual registration if needed, access various tools and reports supplied by the server 100, and so forth. For supplying the services, the server 100 may collect spectrum usage information from various sources, including but not limited to public databases, private databases and deployed radio devices (e.g., in the form of channel use selections or spectrum sensing results). The database information may contain information about known spectrum users, such as incumbent spectrum users (e.g., digital television stations, wireless microphone systems, cable head end systems, FM radio stations, etc.), licensed spectrum users, or radio systems that are exempt from seeking channel map information in order to operate.

In embodiments in this disclosure, the server may undertake spectrum management functions other than those that are described in detail, such as responding to white space channel list requests with appropriate channel lists. Therefore, in some embodiments, the server may be considered a central spectrum "database" or white space registration/allocation system.

Aspects of the disclosed systems and methods are independent of the type or types of devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum, including but not limited to shared spectrum environments such as white spaces (e.g., TV white spaces or TVWS) where available channels are interleaved with licensed channels. Furthermore, the methods and systems are generic to modulation schemes, harmonic considerations, frequency bands or channels used by the electronic device, the type of data or information that is transmitted, how the electronic device uses received information, and other similar communications considerations. Thus, the systems and methods have application in any suitable environment.

Although certain embodiments have been shown and described, it is understood that equivalents and modifications falling within the scope of the appended claims will occur to others who are skilled in the art upon the reading and understanding of this specification.

What is claimed is:

1. A spoke radio device, comprising:
   radio circuitry configured to engage in wireless communications, the wireless communications including establishing a link with a hub radio device using generic channel access credentials to support acquisition of specific channel access credentials from a spectrum management server; and
   a control circuit that executes logical instructions to configure the spoke radio device to:
   generate and send a detailed channel list request to the hub radio device, the detailed channel list request including plural data items selected from a data item to identify the spoke radio device, a data item to specify a current location of the spoke radio device, a data item to identify information regarding an owner or operator of the spoke radio device, and a data item to identify one or more operational characteristics of the spoke radio device;
   process a channel list response containing the specific channel access credentials and received in response to the detailed channel list request, including selecting an available channel specified in the channel list response for use in wireless communications; and
   generate and send a renewal request to the hub radio device to maintain valid use of the selected channel, the renewal request containing fewer data items than the detailed channel list request; and
   wherein the logical instructions further configure the spoke radio device to process a renewal reply received from the hub radio device, the renewal reply being:
   an acknowledgment reply that does not contain channel availability data if the selected channel is still available for use by the spoke radio device, in which case the spoke radio device continues wireless communications using the selected channel; else a channel list response specifying new specific channel access credentials, in which case the spoke radio device makes a new channel selection.

2. The spoke radio device of claim 1, wherein the logical instructions further configure the spoke radio device to generate and send a channel use notification containing the selected channel to the hub radio device after making a channel selection and not after receipt of an acknowledgment reply.

3. The spoke radio device of claim 1, wherein the spoke radio device and the hub radio device are white space radio devices and the available channel is a white space channel.

4. The spoke radio device of claim 1, wherein the channel list response responsive to the detailed channel list request contains specific operating parameters for the spoke radio device, the specific operating parameters specifying a transmit power limit for each available channel.

5. The spoke radio device of claim 4, wherein the selected channel is considered no longer available if the transmit power limit is no longer valid following the renewal request.

6. The spoke radio device of claim 1, wherein the renewal request is sent if the spoke radio device moves more than a predetermined distance.

7. The spoke radio device of claim 1, wherein the renewal request is sent at a predetermined renewal time.

8. The spoke radio device of claim 1, wherein the data items in the renewal request consist of a data item to identify the spoke radio device and a data item that specifies the current location of the spoke radio device.

9. A hub radio device, comprising:
radio circuitry configured to engage in wireless communications using specific operating parameters, the hub radio device having a coverage area in which spoke radio devices are entitled to communicate with the hub radio device using generic operating parameters;
a memory; and
a control circuit that executes logical instructions to configure the hub radio device to:
receive a detailed channel list request from one of the spoke radio devices, the detailed channel list request including plural data items selected from a data item to identify the spoke radio device, a data item to specify a current location of the spoke radio device, a data item to identify information regarding an owner or operator of the spoke radio device, and a data item to identify one or more operational characteristics of the spoke radio device;
send a first proxy channel list request to a spectrum management server with the data items from the detailed channel list request, obtain a base channel list response from the spectrum management server in response to the first proxy channel list request and send the base channel list response to the spoke radio device;
receive a renewal request from the spoke radio device, the renewal request containing fewer data items than the detailed channel list request; and
generate and send a second proxy channel list request to the spectrum management server with a location of the spoke radio device from the renewal request and data items from the detailed channel list request; and
wherein the hub radio device determines whether a channel selected by the spoke radio device for wireless communications is still available for use by the spoke radio device according to channel availability specified in a renewal channel list response and sends a renewal reply to the spoke radio device, the renewal reply being:
an acknowledgment reply that does not contain channel availability data if the selected channel is still available for use by the spoke radio device; else
a channel list response specifying available channels from the renewal channel list response.

10. The hub radio device of claim 9, wherein the hub radio device receives the renewal channel list response from the spectrum management server in response to the second proxy channel list request.

11. The hub radio device of claim 9, wherein if the selected channel is still available for use by the spoke radio device, the hub radio device generates a channel use notification on behalf of the spoke radio device and sends the channel use notification to the spectrum management server.

12. The hub radio device of claim 9, wherein the spoke radio device and the hub radio device are white space radio devices and the available channels are white space channels.

13. The hub radio device of claim 9, wherein the base channel list response and the renewal channel list response contain specific operating parameters for the spoke radio device, the specific operating parameters specifying a transmit power limit for each available channel.

14. The hub radio device of claim 13, wherein a channel selected by the spoke radio device for wireless communications is considered no longer available if the transmit power limit is no longer valid following the renewal request.

15. The hub radio device of claim 9, wherein the data items in the renewal request consist of a data item to identify the spoke radio device and a data item that specifies the current location of the spoke radio device.

16. The hub radio device of claim 9, wherein the hub radio device broadcasts a beacon identifying operating parameters that the spoke radio devices are permitted to use to maintain or restore connectivity with the hub radio device, the operating parameters identified in the beacon including specific operating parameters of one or more spoke radio devices that are associated with the hub radio device and, for each of the one or more associated spoke radio device having specific operating parameters in the beacon, a location.

17. A system comprising: the hub radio device of claim 9; and
the one of the spoke radio devices comprising:
radio circuitry configured to engage in wireless communications, the wireless communications including establishing a link with the hub radio device using generic channel access credentials to support acquisition of specific channel access credentials from the spectrum management server; and
a control circuit that executes logical instructions to configure the one of the spoke radio devices to:
generate and send the detailed channel list request to the hub radio device, the detailed channel list request including the plural data items selected from the data item to identify the spoke radio device, the data
item that specifies the current location of the spoke radio device, the data item to identify the information regarding the owner or operator of the one of the spoke radio devices, and the data item to identify the one or more operational characteristics of the spoke radio device;
process the base channel list response containing the specific channel access credentials received in response to the detailed channel list request, including selecting an available channel specified in the base channel list response for use in wireless communications; and generate and send the renewal request to the hub radio device to maintain valid use of the selected channel, the renewal request containing fewer data items than the detailed channel list request.

* * * * *